United States Patent

Ristroph

Patent Number: 5,172,739
Date of Patent: Dec. 22, 1992

[54] WASTE LIQUID TRANSFER DEVICE

[76] Inventor: Michael J. Ristroph, HC69, Box 609, St. Francisville, La. 70775

[21] Appl. No.: 776,570

[22] Filed: Oct. 15, 1991

[51] Int. Cl.$^5$ .................. B67C 11/04; B65B 39/00
[52] U.S. Cl. .................. 141/98; 141/331; 141/106; 141/333; 141/339; 141/340; 141/366; 141/375; 184/1.5; 215/354; 220/573; 220/908; 33/722; 73/294
[58] Field of Search .................. 141/98, 331, 332, 333, 141/339, 340, 341, 342, 363, 364, 365, 366, 375, 106; 184/106, 1.5; 215/354; 220/355, 307, 908, 573; 33/722; 73/294

[56] References Cited

U.S. PATENT DOCUMENTS

| | | | |
|---|---|---|---|
| 418,738 | 1/1890 | Moull | 141/339 X |
| 421,754 | 2/1890 | Pannill | 141/332 X |
| 637,963 | 11/1899 | Howard | 141/332 X |
| 1,083,107 | 12/1913 | Landers | 141/340 X |
| 2,509,098 | 5/1950 | Howard | 141/340 X |
| 2,643,030 | 6/1953 | Lyon | 141/375 X |
| 2,732,870 | 1/1956 | Nichols | 220/355 X |
| 3,165,227 | 11/1965 | Crowell et al. | 220/355 |
| 4,331,185 | 5/1982 | Rinaldo et al. | 141/95 |
| 4,338,983 | 7/1982 | Hatcher | 141/331 |
| 4,702,290 | 10/1987 | Perez | 141/332 |
| 4,703,867 | 11/1987 | Schoenhard | 141/98 X |
| 4,706,720 | 11/1987 | Pattison et al. | 141/739 |
| 4,802,599 | 2/1989 | Hill | 141/98 X |
| 4,974,647 | 12/1990 | Eastom | 141/98 |
| 5,018,559 | 5/1991 | Branan | 141/339 |
| 5,117,878 | 6/1992 | Shaw et al. | 141/333 |

FOREIGN PATENT DOCUMENTS 220724 12/1902 France .
280504 4/1928 United Kingdom ............ 141/380

Primary Examiner—Ernest G. Cusick
Attorney, Agent, or Firm—Reginald F. Roberts, Jr.

[57] ABSTRACT

A waste-liquid transfer device. In a first embodiment, the device includes a receiver assembly having a horizontal bottom wall and a vertical side wall integral with the bottom wall, providing a receiver cavity for temporarily holding the waste liquid. The vertical side wall defines a cylinder concentric with a standard fifty-five-gallon drum having a top with an opening in it. The receiver assembly fits snugly over the top of the drum, and a drain tube extending downward from the bottom wall fits into the opening in the top of the drum. In a second embodiment, the device includes a receiver assembly having a horizontal bottom wall and a vertical side wall integral with the bottom wall, providing a receiver cavity for temporarily holding the waste liquid. The device further includes a drain pipe leading from the receiver assembly to a storage tank, and a frame supporting the receiver assembly during the transfer operation.

6 Claims, 3 Drawing Sheets

WASTE LIQUID TRANSFER DEVICE

BACKGROUND OF THE INVENTION

1. Field of the Invention

This invention relates generally to devices for transporting and storing waste liquids, and more particularly to the transportation and storage of waste liquids in standard, size drums and containers.

2. Prior Art

Waste liquids in a variety of environments, such as in the automotive and painting industries, are commonly stored in 55-gallon drums. Likewise, such liquids are also present in the home environment and are sometimes stored in standard-size 5-gallon buckets. Spillage problems arise when these liquids are carried from their source and when they are actually transferred to the container for storage. As with most industrial fluids, splashing from the container during transportation as well as during the actual pouring operation can cause not only staining of clothing, but also intolerable hazardous conditions on the floor for shop personnel or in living areas of the home, as well as unwanted environmental pollution. A variety of devices have been used for the purpose of facilitating the transfer of these liquids into a number of different containers, and some have designs which attempt to minimize the chance for splashing. Little has been done, however, to accommodate the widespread use of 55-gallon drums and other common containers, or to adapt devices to conform to their standard dimensions.

In a similar situation, many industries also store such waste liquids in bulk storage tanks. The known methods of transferring the liquids to these tanks range from dumping buckets of the liquid into funnel attachments on the tank to employing sophisticated pumping systems which transfer liquid directly from a vehicle to the bulk storage tank. The former method is deficient for reasons of spillage and inaccuracy in the transfer process, while the latter method is usually cost prohibitive for many businesses.

U.S. Pat. No. 5,018,559 issued to Branan discloses an industrial funnel apparatus for use with 55-gallon drums. A cylindrical-shaped body contains a funnel-shaped cavity converging to a drain opening and which is covered by a hinged lid. A sealing cap is attached to the lid for closing the drain opening. Although that device assists in the draining of liquids into the drum, no means is provided which can act both as a waste liquid receptacle from its source as well as a lid for keeping other materials out of the drum and preventing the escape of fumes from the drum. Also residual liquid may drip from the drain pan used once the liquid is transfered. In addition, the design of the Branan device does not serve to minimize splashing when liquids are emptied into the drum. Furthermore, the apparatus is deficient for not creating a water-tight seal between the drain of the device and the drum, because rain and other materials may collect in the area around the top of the drum.

A simple yet efficient device, therefore, is needed to transfer waste liquids that will minimize the mess associated with most funnel systems and which will also act as a cover for the opening of the tank so that residual liquid may drip completely into the storage container.

SUMMARY OF THE INVENTION

Therefore, it is an object of this invention to provide a device for collecting and transporting waste liquids from a liquid source to standard-size containers, such as 55-gallon drums and 5-gallon buckets.

It is another object of this invention to provide a waste liquid transfer device which is capable of fitting over the top of a standard-size container and assisting in the placement of liquids therein.

It is still another object of this invention to provide a waste liquid transfer device which will minimize splashing of the waste liquid upon transferring it to a standard-size container.

It is yet another object of this invention to provide a waste liquid transfer device whose cover also serves as a waste liquid receptacle from the source of the liquid as well as a means for transporting the liquid from the source to the container.

These and other objects and advantages of the present invention will no doubt become apparent to those skilled in the art after having read the following description of the preferred and alternate embodiments which are contained in and illustrated by the various drawing figures.

Accordingly, a waste liquid transfer device is provided, comprising a receiver assembly having a receiver floor and receiver side walls joined to form a receiver cavity for temporarily holding the liquid being transferred, the receiver floor being shaped to fit over a storage container, such as a 55-gallon drum or a 5-gallon bucket, a drain tube extending from the receiver floor and into an opening in the container, the drain tube having a passageway to permit liquid in the receiver cavity to flow into the container; and a drain pan assembly comprising a drain pan floor and drain pan side walls joined to form a drain pan cavity for receiving the waste liquid from a source, the drain pan side walls being shaped to fit within the receiver side walls when the drain pan assembly is used as a lid for the receiver assembly.

Another embodiment of the invention is provided which comprises all the features of the foregoing device, but which further comprises a bulk tank adaptor for adapting a bulk storage tank to accept a modified receiver assembly for use with the drain pan assembly.

DESCRIPTION OF PREFERRED EMBODIMENTS OF THE INVENTION

Figure 1:
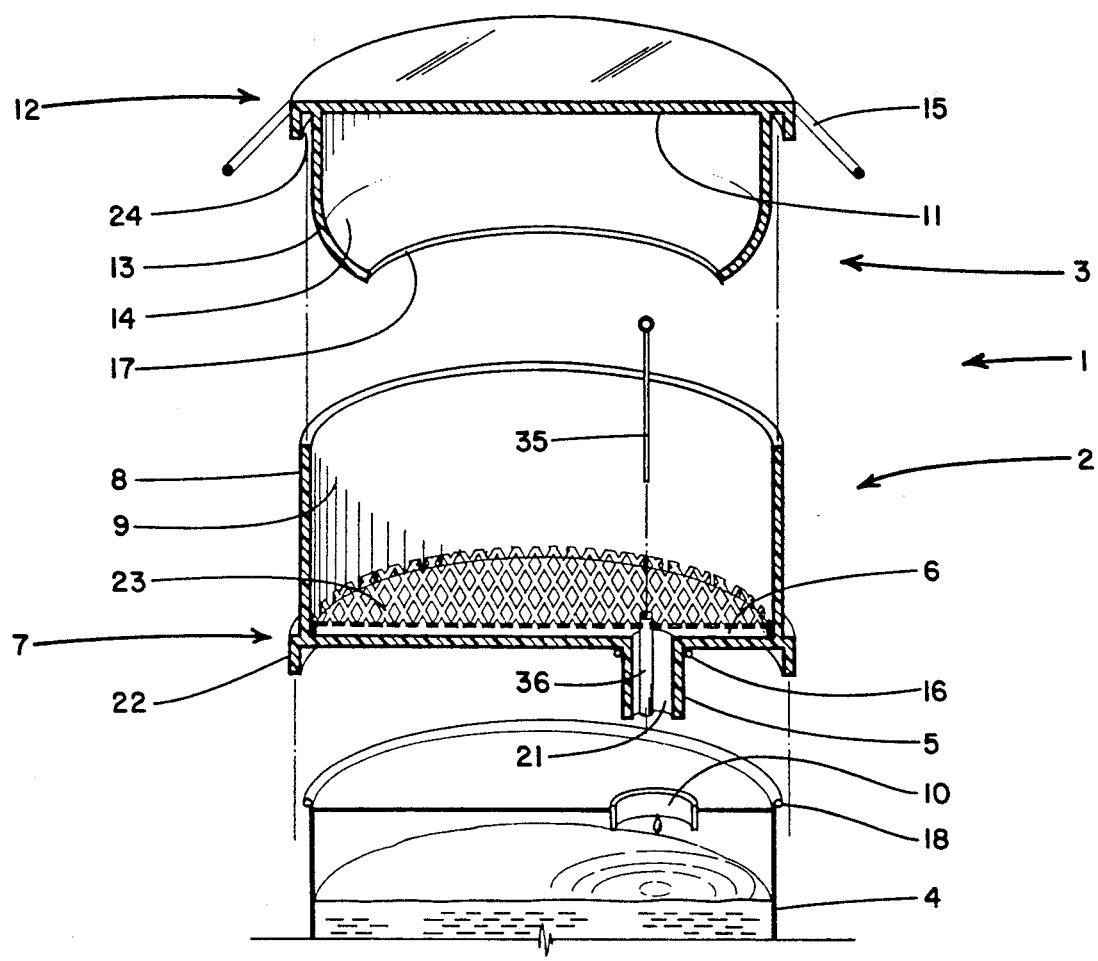
FIG. 1 is an exploded and partially cross-sectioned view of the components of a preferred embodiment of the invention.

The major components of a waste liquid transfer device 1 contemplated by the present invention are shown in FIG. 1. In a preferred embodiment, receiver assembly 2 is placed on top of a standard 55-gallon drum 4 in a manner to be described below, and drain pan assembly 3 fits in an inverted position into the top of receiver assembly 2.

Receiver assembly 2 includes receiver assembly or floor 6, the bottom of which rests on rim 18 of drum 4. Receiver floor 6 may be either sloped or concave to facilitate drainage. To minimize splashing during the transfer process and to filter out unwanted trash from entering drum 4, splash baffle 23 rests on receiver floor 6 and also provides a convenient surface on which to place used oil filters to allow their complete drainage. Splash baffle 23 may be made of any perforated sheet material such as raised-edge or flat expanded sheet metal. Preferably, the baffle 23 is removable from the receiver assembly 2. Drain tube 5 extends downward from and essentially perpendicular to receiver floor 6 such that the end of drain tube 5 will be fully inserted into hole 10 on drum 4 when receiver assembly 2 is properly seated. Passageway 21 is formed within drain tube 5 and allows for the flow of waste liquid 20 between receiver assembly 2 and drum 4. Receiver side walls 8 extend upward from receiver floor 6 to form receiver cavity 9 capable of containing waste liquid 20. In a first embodiment, the side walls 8 comprise a series of interconnected panels. In a second embodiment, the side walls 8 comprise a single vertical wall integral with the receiver floor or horizontal bottom wall 6. In both embodiments the configuration of the side wall 8 or side walls 8 is substantially cylindrical. Even more preferably, the configuration of the side wall 8 or side walls 8 define a cylinder that is substantially concentric with that of a standard fifty-five-gallon storage drum having a top which includes an opening therein, whereby the receiver assembly 2 is constructed and arranged to fit snugly over the top of a standard fifty-five-gallon drum. Most preferably the drain tube 5 is so constructed and arranged that, when the receiver assembly 6 is mounted atop the fifty-five-gallon drum, the tube 5 is disposed in the opening in the top of the drum. Extending downward from receiver side walls 8 and perpendicular to receiver floor 6 is receiver lip means 7, which consists of receiver flange 22 formed about the circumference of receiver floor 6. Receiver lip means 7 not only provides for a more secure fit between receiver assembly 2 and drum 4, but also protects against foreign matter entering drum 4. As a further safeguard against foreign material entering, it is preferred that there be a water-tight seal 16 along the interface between drain tube 5 and hole 10 of drum 4, which could simply be a gasket or ring of rubberized material attached along the underside of receiver floor 6. The material used for receiver assembly 2 may be a corrosion-resistant metal or possibly a molded chemically-resistant plastic. Although not required for proper operation of the device 1, a preferred embodiment may also include a dipstick 35 held in place by dipstick holding tube 36 attached to the inner diameter of drain tube 5. The length of dipstick 35 need only be long enough to determine whether a quantity of waste liquid 20 equal to the full capacity of drain pan cavity 14 may be transfered without experiencing overflow from drum 4.

Drain pan assembly 3 includes drain pan floor 11 and drain pan side walls 13 which are similar in function to receiver floor 6 and receiver side walls 8 in receiver assembly 2. Drain pan side walls 13 also form an aperture 17 whose diameter is less than that of drain pan floor 11 to create drain pan cavity 14 and to minimize splashing when drain pan assembly 3 is being used to receive waste liquid 20 from a source 32. Drain pan lip means 12 is similar in structure and function to receiver lip means 7 in that it consists of drain pan flange 24 formed about the circumference of drain pan side walls 13. Drain pan lip means 12 provides for a secure fit between drain pan assembly 3 and receiver assembly 2, and also protects against foreign matter entering receiver assembly 2. At least two drain pan handles 15 are attached to opposite sides of the drain pan lip means 12 so that drain pan assembly 3 may be easily moved for transferring successive batches of waste liquid 20, for cleaning or as otherwise needed. As with receiver assembly 2, drain pan assembly 3 may be manufactured from a corrosion-resistant metal or possibly from a chemically-resistant plastic. The drain-pan assembly 3 includes an open end and a closed end. The assembly 3 tapers from narrow to wide from the open end to the closed end. The closed end of the drain-pan assembly 3 is substantially concentric with the vertical side wall 8 of the receiver assembly 2. The drain-pan assembly 3 is constructed and arranged so that the open end of the assembly 3 and the drain-pan cavity 14 are disposable within the receiver cavity 9, and so that the closed end of the drain-pan assembly 3 effectively covers the receiver assembly 2 and the receiver cavity 9.

Figure 5:
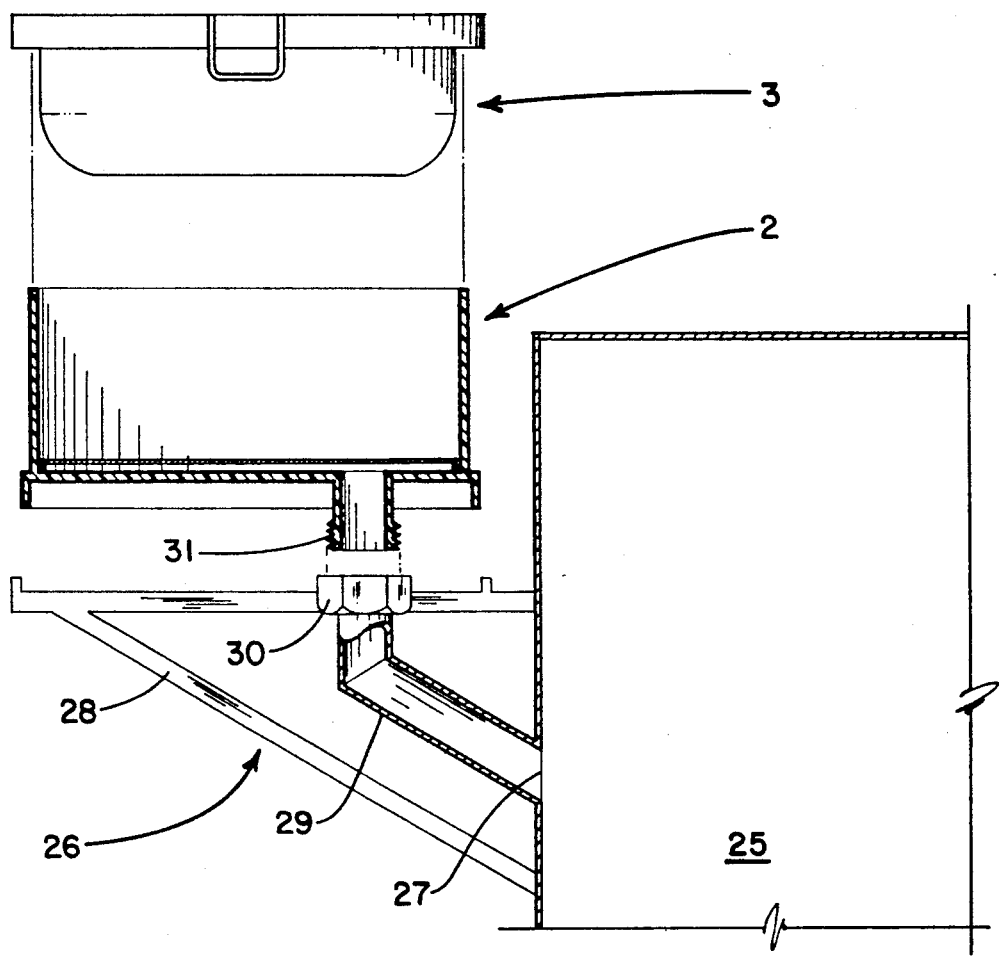
FIG. 5 is another embodiment of the invention showing the receiver assembly, drain pan assembly and bulk tank adaptor means being used with a bulk storage tank.

Another embodiment of the present invention is depicted in FIG. 5. Bulk storage tank 25 can be modified to accept a bulk tank adaptor means 26 by cutting a hole 27 in bulk storage tank 25 and attaching adaptor means 26 either by welding or other fastening technique common in the art. Bulk tank adaptor means 26 comprises support frame 28 and drain pipe 29. Support frame 28 is attached to bulk storage tank 25 and supports receiver assembly 2. Drain pipe 29 is attached to bulk storage tank 25 at hole 27, and includes an internally threaded collar 30. The internal threads of the collar 30 are constructed and arranged to engage external threads 31 on the exterior surface of the drain tube 5. It is preferred that the height of adaptor means 26 be set such that receiver assembly 2 is low enough to provide easy access for transferring waste liquid, but still high enough to allow as much volume of bulk storage tank 25 to be used as possible, as the level of liquid in receiver assembly 2 will reflect the level of liquid in bulk storage tank 25 at a near-full condition.

Figure 2:
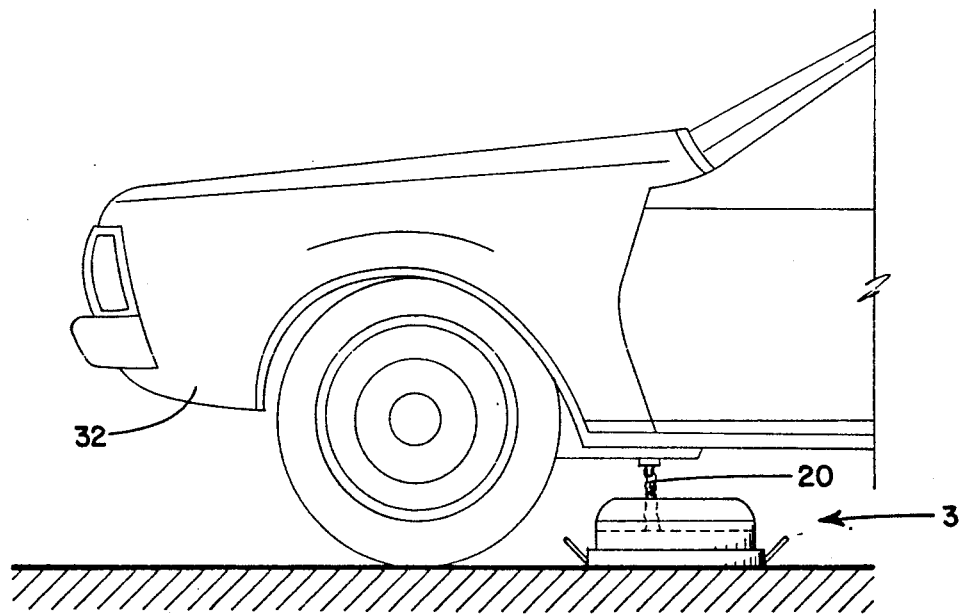
FIG. 2 is a view of the drain pan assembly being used as a receptacle for the waste liquid in the context of the changing of a car's motor oil.
Figure 3:
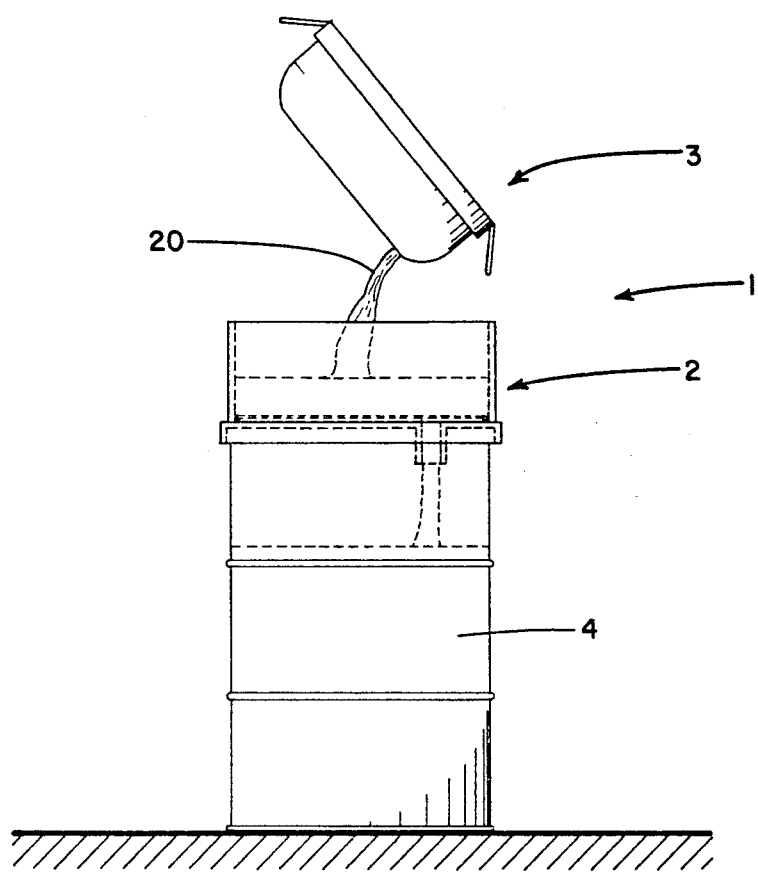
FIG. 3 is a view of the drain pan assembly in a partially inverted position during transfer of waste liquid to the receiver assembly.
Figure 4:
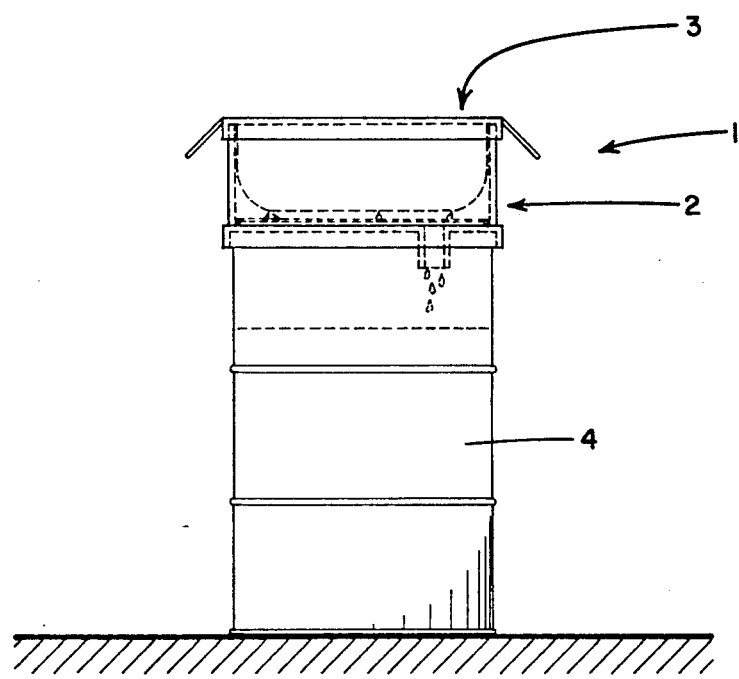
FIG. 4 is a view of a preferred embodiment of the invention with the drain pan assembly acting as a cover and the waste liquid being drained into a 55-gallon drum.

In operation, receiver assembly 2 is placed on top of drum 4 with drain tube 5 inserted into drum hole 10. Drain pan assembly 3 is removed from receiver assembly 2 and placed in a position to receive waste liquid 20, such as motor oil, from a source 32 as depicted in FIG. 2. When drain pan cavity 14 is filled with waste liquid 20, drain pan handles 15 are used to transport drain pan assembly 3 to receiver assembly 2 for emptying. During this transportation period, the drain pan side walls 13 help to prevent splashing of waste liquid 20 out of drain pan cavity 14. As shown in FIG. 3, drain pan assembly 3 is inverted to pour waste liquid 20 into receiver cavity 9, with splash baffle 23 on receiver floor 6 minimizing possible splashing during the transfer. Drain pan assembly 3 is then simply placed upside down on top of receiver assembly 2 so that residual waste liquid 20 is allowed to drain into receiver cavity 9, and then into drum 4 through drain tube 5, as shown in FIG. 4. Because drain pan assembly 3 is acting now as a lid, foreign substances are prevented from entering the waste liquid 20 in receiver assembly 2. Likewise, receiver lip means 7 and seal 16 provide similar protection from contamination at the interface of drum 4 and receiver assembly 2.

In a typical industrial environment, one receiver assembly 2 would be used for each drum 4, with the number of drain pan assemblies 3 being greater than the number of drums 4. This arrangement would allow for all drums 4 to have drain pan assemblies 3 acting as lids, while the extra drain pan assemblies 3 could be used for collection of waste liquid 20. When waste liquid 20 is added to drum 4, drain pan assembly 3 formerly serving as a lid is now used to retrieve another batch of waste liquid 20, and drain pan assembly 3 formerly serving as a means for transport is now used as a lid. Cycling the use of drain pan assemblies 3 in this manner allows shop personnel to always be assured of a drip-free drain pan assembly 3 for use in collecting waste liquid 20.

Other embodiments of the present invention will occur to those skilled in the art, particularly one in which the dimensions of the device 1 are reduced proportionally to allow its use with smaller storage containers, such as standard-size 5-gallon buckets used in both the home and industrial environments. Such modifications and embodiments are intended to be included within the scope and spirit of the following claims.

I claim:

1. A waste liquid transfer device, comprising:
   (a) a receiver assembly comprising
      i) a receiver floor, said floor being shaped to fit over a storage means;
      ii) a plurality of receiver side walls joined to said receiver floor to form a receiver cavity for temporarily holding said waste liquid being transferred;
      iii) a drain tube extending downward from said receiver floor and insertable into an opening in said storage means, said drain tube having a passageway to permit said waste liquid in said receiver cavity to flow into said storage means;
      iv) a dipstick; and
      v) a dipstick holding tube fixedly attached to the inner diameter of said drain tube, for holding said dipstick; and
   (b) a drain pan assembly comprising
      i) a drain pan floor; and
      ii) a plurality of drain pan side walls joined to said drain pan floor to form a drain pan cavity for receiving said waste liquid to be transferred to said receiver assembly, said plurality of drain pan side walls being shaped to fit within said receiver cavity.

2. A waste liquid transfer device, comprising:
   (a) a receiver assembly comprising
      i) a receiver floor;
      ii) a plurality of receiver side walls joined to said receiver floor to form a receiver cavity for temporarily holding said waste liquid being transferred; and
      iii) a drain tube extending downward from said receiver floor, said drain tube having a passageway to permit said waste liquid in said receiver cavity to flow from said receiver cavity;
   (b) a drain pan assembly comprising
      i) a drain pan floor; and
      ii) a plurality of drain pan side walls joined to said drain pan floor to form a drain pan cavity for receiving said waste liquid to be transferred to said receiver assembly, said plurality of drain pan side walls being shaped to fit within said receiver cavity; and
   (c) a bulk tank adaptor means for modifying a bulk storage tank to accept said receiver assembly, and for acting as a conduit for waste liquid form receiver assembly to said bulk storage tank; said bulk tank adaptor means comprising
      i) a drain pipe having an outlet end and an inlet end, said outlet end being sealably matable with a hole in said bulk storage tank, and said inlet end comprising an internally-threaded collar matable with said externally-threaded drain tube; and
      ii) a support frame operatively attached to said bulk storage tank, for supporting said receiver assembly during said waste-liquid transfer.

3. A waste-liquid transfer device for transferring waste liquid to a standard fifty-five gallon storage drum having a top which includes an opening therein, said transfer device comprising:
   a receiver assembly including
      (a) a horizontal bottom wall; and
      (b) a vertical side wall integral with said bottom wall;
   said bottom and side walls defining therebetween a receiver cavity for temporarily storing said waste liquid; and
      (c) a drain tube extending downward from said bottom wall;
   said vertical side wall defining a cylinder substantially concentric with said storage drum; said receiver assembly being constructed and arranged to fit snugly over said top of said storage drum, and said drain tube being so constructed and arranged that, when said receiver assembly is mounted atop said drum, said drain tube is disposed in said opening of said drum; and
   a drain-pan assembly including an open end and a closed end, said assembly tapering from narrow to wide from said open end to said closed end; said closed end of said drain-pan assembly being substantially concentric with said vertical side wall of said receiver assembly, said drain-pan assembly defining a drain-pan cavity for receiving said waste liquid being transferred to said receiver assembly, said drain-pan assembly being constructed and arranged so that said open end of said drain-pan assembly and said drain-pan cavity are disposable within said receiver cavity, and so that said closed end of said drain-pan assembly effectively covers said receiver assembly and said receiver cavity.

4. The device of claim 3, further comprising:
   (d) means for determining the level of said waste liquid in said drum.

5. The device of claim 3, further comprising:
   (d) a dipstick, for determining the level of said waste liquid in said drum.

6. The device of claim 5, further comprising:
   (e) a dipstick holding tube, fixedly attached to the inner surface of said drain tube, for holding said dipstick disposed in said drain tube.

* * * * *